(12) United States Patent
Al-Sarraf

(10) Patent No.: US 10,426,132 B2
(45) Date of Patent: Oct. 1, 2019

(54) SMALL ANIMAL RESISTANCE EXERCISE SYSTEM

(71) Applicant: KUWAIT UNIVERSITY, Safat (KW)

(72) Inventor: Hameed Ali Al-Sarraf, Safat (KW)

(73) Assignee: Kuwait University, Safat (KW)

( * ) Notice: Subject to any disclaimer, the term of this patent is extended or adjusted under 35 U.S.C. 154(b) by 190 days.

(21) Appl. No.: 15/801,157

(22) Filed: Nov. 1, 2017

(65) Prior Publication Data

US 2019/0124883 A1  May 2, 2019

(51) Int. Cl.
*A01K 1/03* (2006.01)
*A01K 1/035* (2006.01)
*A01K 15/02* (2006.01)
*A01K 1/06* (2006.01)

(52) U.S. Cl.
CPC .............. *A01K 1/035* (2013.01); *A01K 1/031* (2013.01); *A01K 1/0613* (2013.01); *A01K 15/027* (2013.01)

(58) Field of Classification Search
CPC .... A01K 15/027; A01K 1/031; A01K 29/005; A01K 15/02; A01K 5/0114; A01K 1/0613; A01K 1/035
USPC ................. 119/421, 417, 700, 416, 420, 703
See application file for complete search history.

(56) References Cited

U.S. PATENT DOCUMENTS

| | | | |
|---|---|---|---|
| 3,861,675 A | 1/1975 | Hopper | |
| 3,974,798 A * | 8/1976 | Meetze, Jr. | A01K 1/031 |
| | | | 119/421 |
| 5,234,392 A * | 8/1993 | Clark | A63B 69/0035 |
| | | | 482/112 |
| 5,613,926 A | 3/1997 | Michaelson | |
| 6,609,478 B2 * | 8/2003 | Del Valle | A01K 15/027 |
| | | | 119/703 |
| 6,679,198 B1 | 1/2004 | LaGarde | |
| 6,715,444 B1 * | 4/2004 | Yabusaki | A01K 1/031 |
| | | | 119/421 |
| 6,837,186 B1 | 1/2005 | Terao | |

(Continued)

FOREIGN PATENT DOCUMENTS

| | | |
|---|---|---|
| CN | 103688877 A | 4/2014 |
| RU | 2 174 853 C1 | 10/2001 |
| WO | WO 2017/049301 A2 | 3/2017 |

OTHER PUBLICATIONS

Morey-Holton, "Hindlimb unloading rodent model: technical aspects," Journal of Applied Physicology, Published Apr. 1, 2002, vol. 92, No. 4, 1367-1377.

*Primary Examiner* — Yvonne R Abbott-Lewis
(74) *Attorney, Agent, or Firm* — Richard C. Litman

(57) ABSTRACT

A system for examining resistance exercise includes a first trap compartment, a second trap compartment, a main track compartment and a pulley system which can be aligned to form a continuous tunnel. Each of the compartments can have adjustable dimensions to retain small animals of various sizes. The pulley system includes a clamp and a pulley shaft. The pulley shaft is pivotally attached to the clamp at a lower end and a first pulley wheel at an upper end. A second pulley wheel is pivotally attached to the clamp. A rope is trained on the pulley wheels. The tunnel can be positioned on an elevated support surface. One end of the rope is attachable to a rat on the elevated support surface and the other end of the rope is to attached to liftable strength training objects positioned below the elevated support surface.

10 Claims, 5 Drawing Sheets

(56) References Cited

U.S. PATENT DOCUMENTS

| | | | |
|---|---|---|---|
| 7,086,350 B2 * | 8/2006 | Tecott | A01K 1/031 |
| | | | 119/421 |
| D558,936 S * | 1/2008 | Tamura | D30/160 |
| 7,442,151 B1 * | 10/2008 | Berdegue | A63B 69/12 |
| | | | 434/254 |
| 7,536,977 B1 * | 5/2009 | Williams | A01K 15/027 |
| | | | 119/700 |
| 7,841,964 B2 | 11/2010 | Radow | |
| 8,220,415 B2 * | 7/2012 | Ragatz | A61B 5/0059 |
| | | | 119/417 |
| 8,485,133 B1 * | 7/2013 | Osmekhin | A01K 1/031 |
| | | | 119/416 |
| 9,795,819 B2 * | 10/2017 | Wehrell | A63B 23/047 |
| 2016/0374317 A1 * | 12/2016 | Hayashi | A01K 15/027 |
| | | | 119/700 |

* cited by examiner

SMALL ANIMAL RESISTANCE EXERCISE SYSTEM

BACKGROUND

1. Field

The disclosure of the present patent application relates to animal evaluation and examination, and particularly to an apparatus for examining resistance exercise (weight lifting) in small laboratory animals.

2. Description of the Related Art

Resistance exercise equipment that measures the benefits of resistance exercise in animals is useful in developing beneficial exercise routines and exercise equipment for people. Despite the considerable amount of effort that has been expended over the years in developing exercise equipment, a need remains for a simple, cost-effective system for examining resistance exercise in small laboratory animals.

Thus, a small animal resistance exercise system solving the aforementioned problems is desired.

SUMMARY

A system for examining resistance exercise includes a first trap compartment, a second trap compartment, a main track compartment and a pulley system. The first trap compartment, the second trap compartment, and the main track compartment can be aligned to form a continuous tunnel, with the main track compartment positioned between the first trap compartment and the second trap compartment. Each of the compartments, can have adjustable dimensions to retain small animals of various sizes. The pulley system includes a clamp and a pulley shaft. The pulley shaft is pivotally attached to the clamp at a lower end and a first pulley wheel at an upper end. A second pulley wheel is pivotally attached to the clamp. A rope is trained on the pulley wheels. One end of the rope is attachable to a rat for examination and the other end of the rope is attached to liftable strength training objects.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
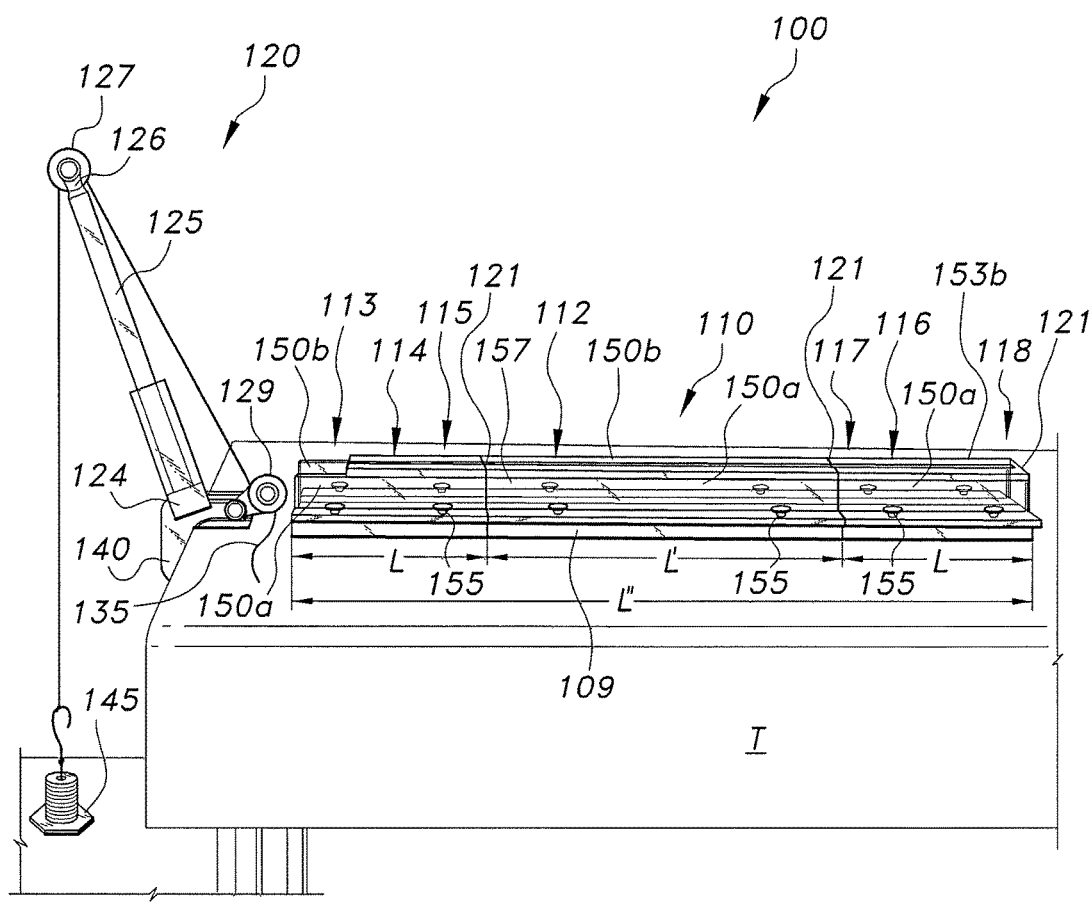
FIG. 1 is an environmental, perspective view of a small animal resistance exercise system, according to the present teachings.
Figure 2:
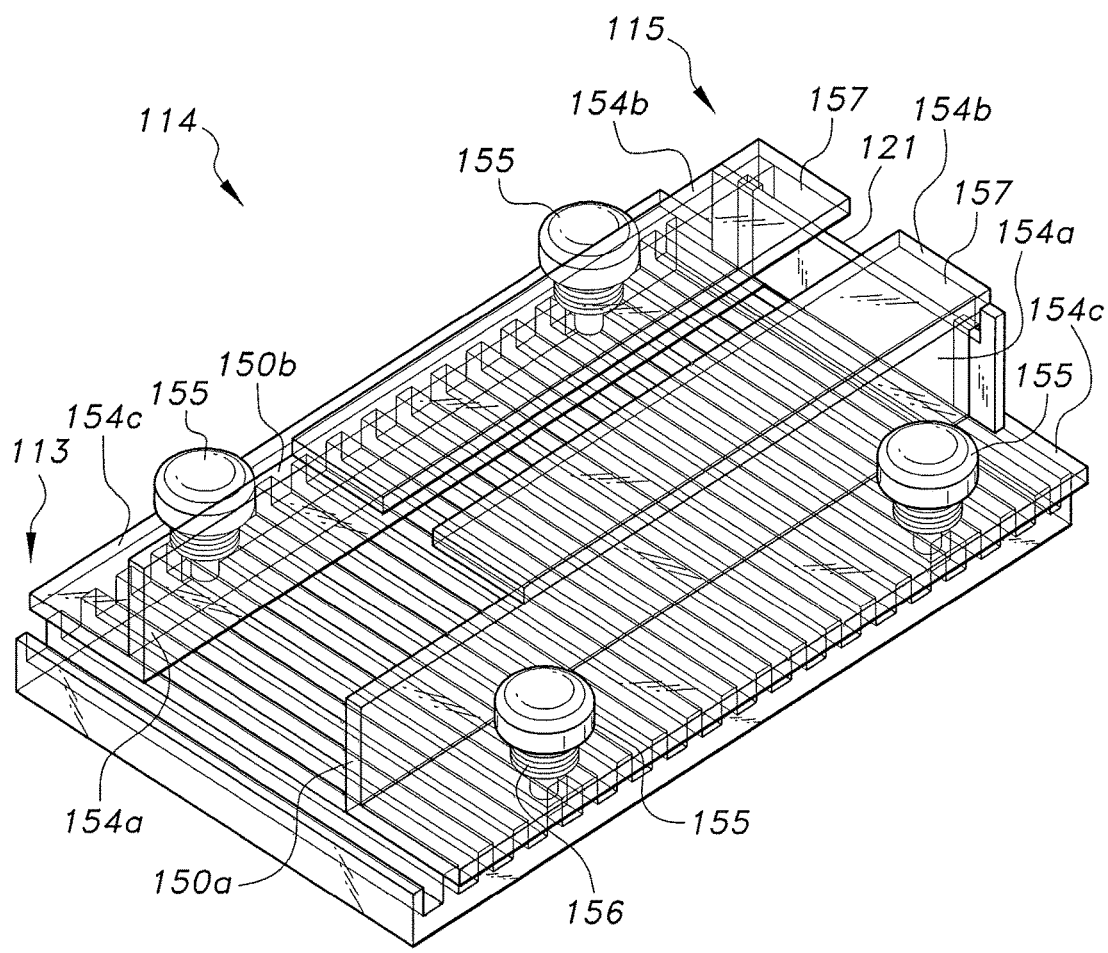
FIG. 2 is a top perspective view of the first compartment of the small animal resistance exercise system.

Referring to FIGS. 1 through 5B, a system 100 for examining resistance exercise, e.g., weight lifting in small laboratory animals, such as rats R, is generally illustrated. The system 100 includes a first trap compartment 114, a second trap compartment 116, a main track compartment 112 and a pulley system 120. The first trap compartment 114, the second trap compartment 116, and the main track compartment 112 can be aligned to form a continuous tunnel 110, with the main track compartment 112 positioned between the first trap compartment 114 and the second trap compartment 116, as shown in FIG. 1. The first trap compartment 114 and the second trap compartment 116 can be identical. The first trap compartment 114, the second trap compartment 116, and the main track compartment 112 each include a floor portion 109 and a pair of opposing sidewalls 150a, 150b adjustably positioned on the floor portion 109. A slidable gate 121 can be positioned between the opposing sidewalls 150a and 150b at the front end 113 or rear end 115 of the first trap compartment 114 and at the front end 117 or rear end 118 of the second trap compartment 116, as shown in FIG. 2. Each of the compartments, 112, 114, and 116, can have adjustable dimensions to retain small animals of various sizes. The slidable gates 121 can prevent the animal from escaping the trap compartments 114, 116.

Figure 3:
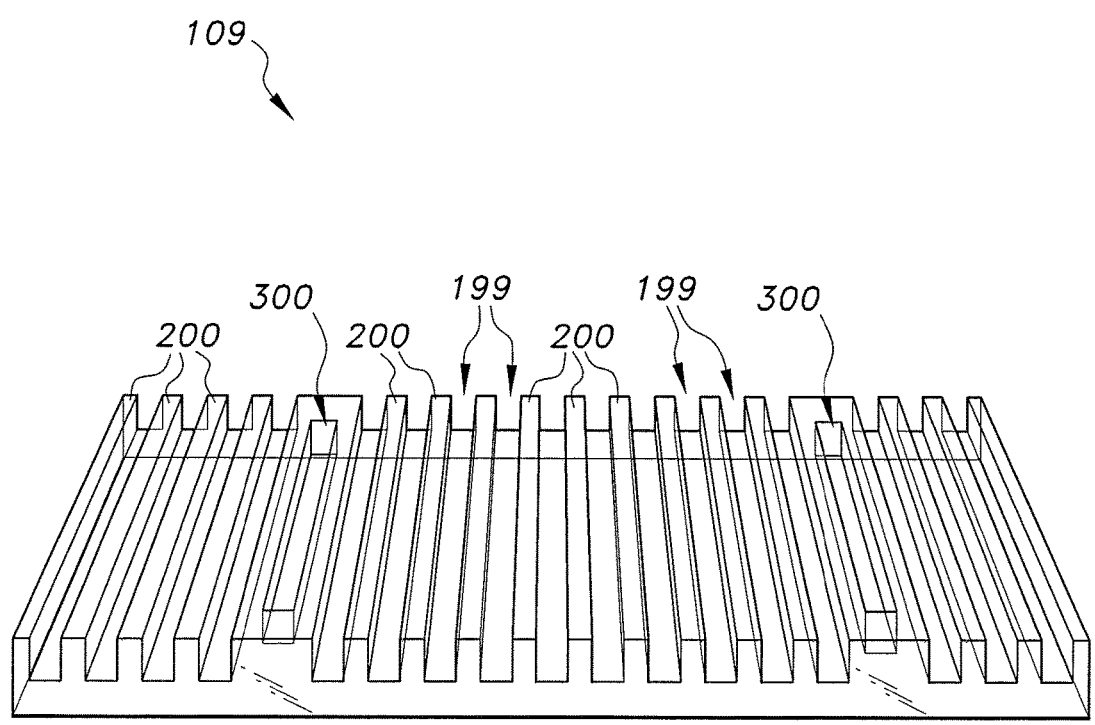
FIG. 3 is a side perspective view of a floor portion of the small animal resistance exercise system.

Each floor portion 109 includes a plurality of open-ended grooves 199 and a plurality of closed-ended grooves 300 defined therein, as shown in FIG. 3. A plurality of ridges 200 separate each of the open-ended grooves 199 and the closed-ended grooves 300. In an embodiment, each groove 199, 300 may be approximately 0.8 millimeters deep and each ridge 200 may be approximately 0.7 millimeters in length and approximately 0.5 millimeters in width. The grooves 199 and the ridges 200 can prevent the animal from sliding on the floor portion 109. The closed-ended grooves 300 are configured for slidably receiving screws 155, as will be discussed in detail herein.

Each sidewall includes an upright portion 154a, a roof portion 154b extending from a top end of the upright portion 154a, and a base portion 154c extending from a bottom end of the upright portion 154a. Each roof portion 154b extends over the floor portion 109. The base portion 154c rests on top of the floor portion 109. The roof and base portions 154b, 154c extend in opposing directions. The screws 155 extend through the base portion 154c and engage the closed-ended grooves 300 of the floor portion 109. Washers 156 can be provided to secure the screws 156 in a raised position.

The width of the compartments 112, 114, and 116, such as the distance between the first sidewall 150a and the second sidewall 150b may be adjusted by loosening the screws 155, sliding the sidewalls closer together or further apart as desired, and tightening the screws 155 in an appropriate position within the grooves 300. The height of the compartments can be adjusted by adding or removing washers 156. In an embodiment, the width of the tunnel can range from about 4.5 centimeters to about 8 centimeters, to accommodate animals having different girths.

The roof portion 154b of the main track compartment 112 includes an overhang 157 at one end. The overhang 157 extends a predetermined length, e.g., about 7 centimeters, beyond the edge of the floor portion 109 of the main track compartment 112. In other words, a length of the roof portion 154b of the main track compartment 112 can be greater than a length of the upright portion of the main track compartment 112. The roof portions 154b of the first trap compartment 114 and the second trap compartment extend only partially along the length of the sidewalls, leaving an open or exposed space of, e.g., about 7 centimeters, at the top edge of the sidewalls. This can facilitate adjusting the length of each trap compartment 114, 116 to accommodate animals of different lengths. This exposed space can be covered by the overhang 157 of the main track compartment when the compartments are aligned.

The pulley system 120 includes a clamp 140 and a pulley shaft 125. The pulley shaft 125 has an upper end 126 and a lower end 124. The lower end 124 is pivotally attached to the clamp 140. A first pulley wheel 127 is rotatably attached to the upper end 126 of the pulley shaft 125 and a second pulley wheel 129 is pivotally attached to the clamp 140. A rope 135 is trained on the pulley wheels 127, 129. One end of the rope 135 is attachable to a rat R for examination and the other end of the rope 135 is attached to liftable strength training objects, such as one or more weight plates 145 having a pre-determined amount of weight. The tunnel 110 may be positioned on an elevated support surface, such as a table T as illustrated in FIG. 1. The clamp 140 may be secured to an edge of the table T, such that the rope 135 extends beyond the edge of the table T. The table T may have any suitable height, such as a height of approximately 120 centimeters.

The main track section 112, as well as each trap compartment 114, 116 that forms the tunnel 110 can be formed from Plexiglass or any other suitable material.

Figure 4:
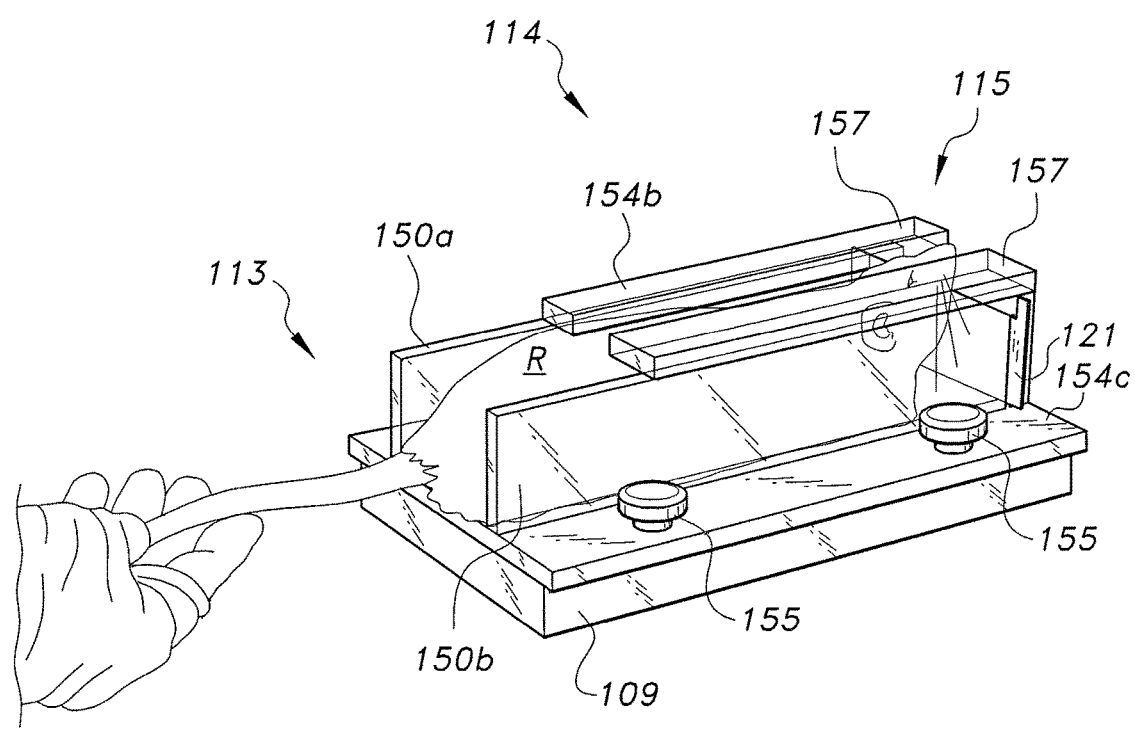
FIG. 4 illustrates a rat positioned within the first compartment.

The rat R may enter the tunnel 110 through the front end 113 of the first trap compartment 114, as shown in FIG. 4. Each trap compartment 114, 116 may be interchangeable with the other, such as after each weight lifting run. For example, the second trap compartment 116 can be interchanged with the first trap compartment 114 once the rat reaches the second trap compartment 116, and vice versa. The trap compartments 114, 116 may have any suitable length L, such as a length of 25 centimeters, and function as traps for the rat R. The main track section 112 may be of any suitable length L' depending of the type of weight lifting exercise required. For example, the length L' of the main track section 112 may be about 20 centimeters to study weight lifting exercises that improve muscle strength, about 80 centimeters for weight lifting exercises that improve muscle size, or about 120 centimeters for weight lifting exercises that improve endurance of the muscle. As such, the length L" of the entire tunnel 110 may range from about 70 centimeters to about 170 centimeters. The tunnel 110 may be configured to accommodate small animals weighing between about 150 g to about 750 g. It is to be noted that the design of the tunnel 110 may also be modified to account for smaller animals, such as mice. The height of the sidewalls 150a, 150b of the tunnel 110 may vary to accommodate animals of various heights.

The pulley shaft 125 of the pulley system 120 can be formed from any suitable material, such as Plexiglass. Once secured to the edge of the table T, the upper portion of the pulley shaft 125 may extend above the table T. One end of the rope 135 is attached to the tail of the rat R with an adhesive member 500, such as surgical sticky tape or any other suitable type adhesive member 500. The other end of the rope 135 extends below the table and is attached to the one or more weight plates 145. The one or more weight plates 145 may provide resistance ranging from approximately 50 g to approximately 1500 g, such as in increments of approximately 50 g or 100 g.

Figure 5A:
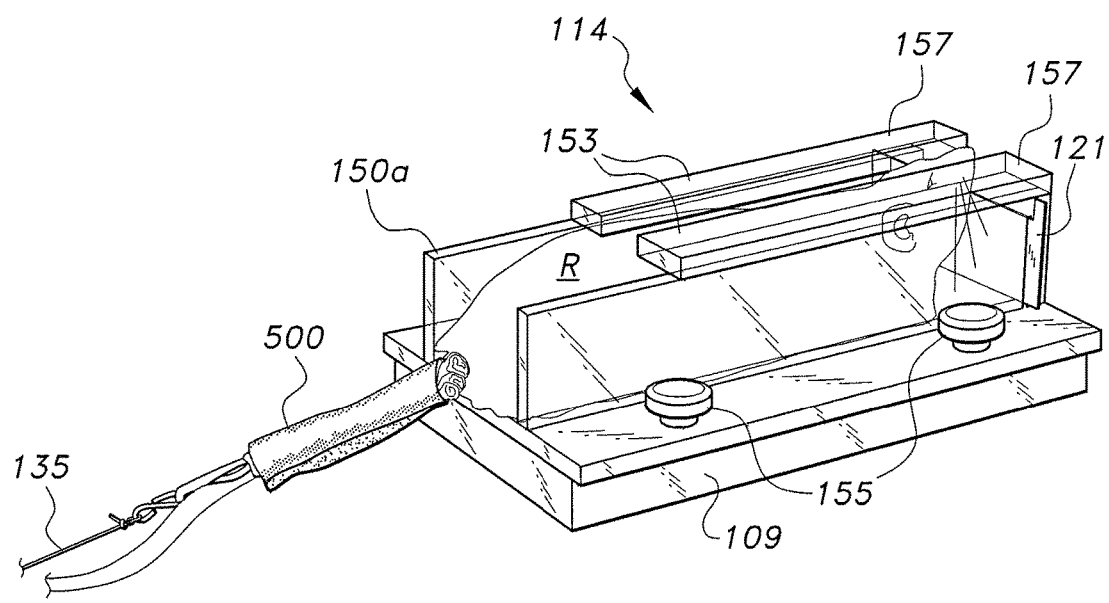
FIG. 5A illustrates the rat attached to the pulley system of the small animal resistance exercise system.
Figure 5B:
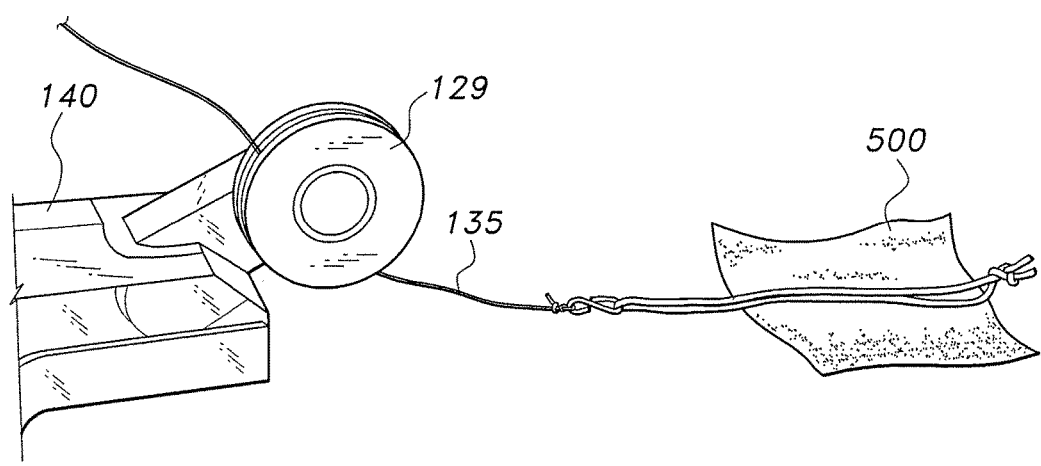
FIG. 5B illustrates a rope trained on a portion of the pulley system of the small animal resistance exercise system.

At the start of an experiment, the rat R or other laboratory animal is positioned at or near the front end 113 of the first trap compartment 114. Once the rat R enters the first trap compartment 114, the rat R is trapped by the gate 121 positioned at the rear end 115 of the first trap compartment 114. One end of the rope 135 is attached to the tail of the rat R by adhesive member 500, as shown in FIGS. 5A and 5B. The adhesive member 500, e.g., surgical sticky tape, can withstand at least 2 kg of weight being pulled by the rat R via the rope 135. Surgical sticky tape can allow the rat to pull the rope 135 attached to the one or more weight plates 145 with no apparent pain or injury. It should take approximately 6 to 8 seconds to secure the rat R in the first trap compartment 114 and attach the rope 135 to the rat's R tail.

Once one end of the rope 135 is secured to the tail of the rat R, the other end of the rope 135 is fed under the second pulley wheel 129 and over the first pulley wheel 127 and subsequently tied to the one or more weight plates 145 resting on the floor. After the rope 135 has been fed though the pulley system 120 and connected to the one or more weight plates 145, the gate 121 from the rear end 115 of the first trap compartment 114 is opened so that the rat R may move through the tunnel 110 while pulling the one or more weight plates 145. When the rat R reaches the rear end 118 of the second trap compartment 116, the second trap compartment 116 may then be interchanged with the first trap compartment 114, such that the rat R is positioned at the beginning of the tunnel 110 so as to begin a new cycle. It is to be noted that various exercise programs can be implemented to control parameters of resistance exercise, such as the amount of load, number of repetitions, number of sets, and rest intervals between sets.

It is to be understood that the small animal resistance exercise system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A small animal resistance exercise system, comprising:
  a main track compartment having a floor portion and opposing side walls positioned on the floor portion, the floor portion including a plurality of open-ended grooves and a plurality of closed-ended grooves defined therein, and each of the opposing side walls including an upright portion, a roof portion extending from a top end of the upright portion, and a base portion extending from a bottom end of the upright portion;
  a pair of trap compartments, each of the trap compartments including a floor portion and opposing side walls positioned on the floor portion, the floor portion including a plurality of open-ended grooves and a plurality of closed-ended grooves defined therein, each of the sidewalls including an upright portion, a roof portion extending partially along a top end of the upright portion, and a base portion extending from a bottom end of the upright portion;
  a plurality of screws configured for extending through the base portion of the trap compartments and the main track compartment and engaging the closed-ended grooves of the floor portion;
  a pulley system including:
    a clamp and a pulley shaft, the pulley shaft having an upper end and a lower end, the lower end being pivotally attached to the clamp;
    a first pulley wheel rotatably attached to the upper end of the pulley shaft;
    a second pulley wheel pivotally attached to the clamp;
    a rope trained on the pulley wheels; and
  one or more weight plates for attaching to an end of the rope.

2. The small animal resistance exercise system recited in claim 1, wherein the main track compartment and the pair of track compartments are formed from Plexiglass.

3. The small animal resistance exercise system recited in claim 1, wherein each trap compartment further comprises a slidable gate extending between the opposing side walls.

4. The small animal resistance exercise system recited in claim 1, further comprising a plurality of washers configured for attaching to the plurality of screws.

5. The small animal resistance exercise system recited in claim 1, wherein a length of each trap compartment is about 25 centimeters.

6. The small animal resistance exercise system recited in claim 1, wherein a length of the main track section ranges from about 20 centimeters to about 120 centimeters.

7. The small animal resistance exercise system recited in claim 1, wherein each of the open-ended grooves and the closed-ended grooves has a depth of about 0.8 millimeters.

8. The small animal resistance exercise system recited in claim 1, wherein a length of the roof portion of the main track compartment is greater than a length of the upright portion.

9. The small animal resistance exercise system recited in claim 1, wherein a length of the roof portion of the pair of trap compartments is less than a length of the upright portion.

10. A small animal resistance exercise system, comprising:
   a main track compartment having a floor portion and opposing side walls positioned on the floor portion, the floor portion including a plurality of open-ended grooves and a plurality of closed-ended grooves defined therein, and each of the opposing side walls including an upright portion, a roof portion extending from a top end of the upright portion, and a base portion extending from a bottom end of the upright portion, a length of the roof portion being greater than a length of the upright portion;
   a pair of trap compartments, each of the trap compartments including a floor portion and opposing side walls positioned on the floor portion, the floor portion including a plurality of open-ended grooves and a plurality of closed-ended grooves defined therein, each of the sidewalls including an upright portion, a roof portion extending partially along a top end of the upright portion, and a base portion extending from a bottom end of the upright portion, a length of the roof portion being less than a length of the upright portion;
   a plurality of screws configured for extending through the base portion of the trap compartments and the main track compartment and engaging the closed-ended grooves of the floor portion;
   a pulley system including:
      a clamp and a pulley shaft, the pulley shaft having an upper end and a lower end, the lower end being pivotally attached to the clamp;
      a first pulley wheel rotatably attached to the upper end of the pulley shaft;
      a second pulley wheel pivotally attached to the clamp;
      a rope trained on the pulley wheels; and
   one or more weight plates for attaching to an end of the rope.

* * * * *